Sept. 11, 1951  W. A. MOORE  2,567,616
INSECT DESTROYER
Filed Oct. 3, 1947
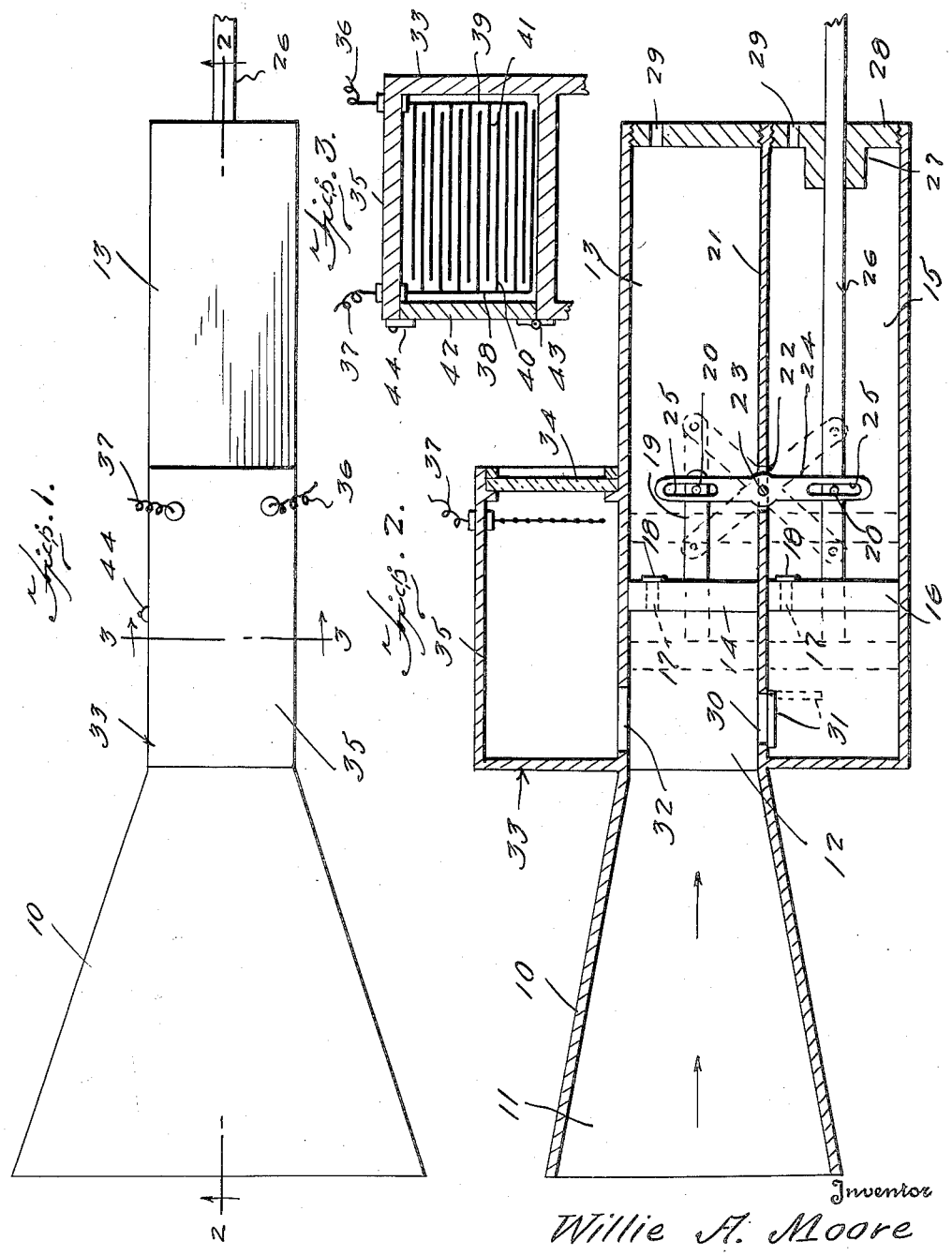
Inventor
Willie A. Moore
By
McMorrow, Berman & Davidson
Attorneys Patented Sept. 11, 1951

2,567,616

UNITED STATES PATENT OFFICE 2,567,616

INSECT DESTROYER

Willie Allen Moore, Grambling, La.

Application October 3, 1947, Serial No. 777,777

1 Claim. (Cl. 43—139)

My invention relates to insect destroyers, and more particularly to insect destroyers wherein insects are caused to enter a trap chamber and are therein killed preferably electrically.

With the foregoing in view, an object of my invention is to provide an improved insect destroyer of the class described.

A further object is to provide an improved insect destroyer, wherein means are provided for drawing a current of air into a conduit, a trap chamber opening off of said conduit, means for luring insects into said trap chamber, and means in said trap chamber between said luring means and the opening into said chamber for electrically destroying insects flying in said chamber as they seek to escape from being drawn into the conduit.

A further object is to provide an insect destroyer such as that last described, wherein the air current may be utilized to vent air from a closed room to ventilate the room.

A further object is to provide a novel combination of means for ventilating a room with an insect destroyer.

Other objects and advantages reside in the particular structure of the invention, combination and arrangement of the several parts thereof, and in the particular method or mode of operation, all of which will be readily apparent to those skilled in the art upon reference to the attached drawings and to the following specification, wherein the invention is shown, described and claimed.

In the drawings:

Figure 1 is a plan view of an insect destroyer according to the invention;

Figure 2 is a longitudinal vertical section taken substantially on the plane of the line 2—2 of Figure 1;

Figure 3 is a transverse vertical section of the trap chamber taken substantially on the plane of the line 3—3 of Figure 1.

Referring specifically to the drawings, wherein like reference characters have been used throughout the several views, 10 designates a conduit having a flared open end 11 and a reduced rear end 12 which merges into a cylinder 13. A piston 14 is reciprocably mounted in the cylinder 13. A second cylinder 15 is subjacently disposed relative to the cylinder 13 and separated therefrom by a common wall 21. The cylinder 15 has a piston 16 reciprocable therein. Each of the pistons 14 and 16 is formed with an aperture 17 therethrough which is closed by the usual pump valve 18, whereby actuation of the pistons from right to left will cause the pump valves 18 to open, but which valves are closed as the pistons move from left to right, as seen in Figure 2. The piston 14 is provided on its rear face with a suitable piston rod 19 having a pin 20 extending laterally thereof adjacent the free end. The common wall 21 is provided with an aperture 22 therethrough in the region of the free end of the piston rod 19 and is provided with a transversely-extending pivot pin 23 thereacross. A walking beam or rocker arm 24 is pivoted on the pin 23 intermediate the ends of the arm. The free ends of the arm 24 are formed to provide longitudinally-aligned closed slots 25. The upper slot 25 slidingly receives the pin 20 of the piston rod 19 for the upper piston. The lower piston 16 has a rigid piston rod 26 attached thereto, which is substantially elongated and extends through the rear wall 28 of the cylinder 15 and is slidingly supported therein by the bushing 27. The free end of the rod 26 outwardly of the cylinder 15 is connected to any suitable source of reciprocating power, not shown. A second pin 20 extends laterally of the piston rod 26 and has a sliding fit in the lower slot 25 of the rocker arm 24. The common wall 21 for the cylinders 13 and 15 has an opening 30 formed therethrough adjacent the front end thereof. Such opening or port 30 may be closed by a one-way flap valve 31, whereby the same will be opened as the lower piston 16 moves from left to right, Figure 2, and will be closed when such piston moves from right to left.

It follows from the foregoing that as the piston rod 26 is rapidly reciprocated, the pistons 14 and 16 are reciprocated therewith, but in opposite directions to and from the broken line positions of Figure 2. The action of the pistons provides a substantially continuous pumping of air into the conduit 10 through the flared opening 11 thereof in the direction of the arrows. Such air eventually escapes through the apertures or ports 17 and flap valves 18 of the pistons and is eventually discharged through the openings 29 formed through the rear walls of the cylinders 13 and 15. Thus, not only will air be drawn into the conduit 10, but insects will be drawn thereinto also. The draft created will be particularly effective against smaller flying insects, such as mosquitoes, flies or gnats.

To destroy the insects drawn into the conduit 10, I provide an opening 32 through the upper wall thereof forwardly of the forward stroke of the piston 14. A trap chamber 33 is positioned atop the cylinder 13 and is formed to provide a transparent rear wall 34 remotely of the opening 33. The upper wall 35 of the trap chamber has extended therethrough the leads 36 and 37 of an electric circuit, which are suitably connected to any desired source of electric current, not shown. The lead 37 is connected to a bus bar 38 which extends along one side of the trap chamber 33. The other lead 36 is connected to a bus bar 39 which extends downwardly along the opposite side wall of the trap chamber. Each bus bar has extended therefrom in any suitable manner a plurality of finely-spaced bare wires 40 and 41, respectively. Such open structure has been shown diagrammatically as a grille in Figure 3, and the wires 40 and 41 are alternately arranged whereby to provide spaces therebetween which are too fine for the passage of an insect therethrough without contacting at least two adjacent wires or electrocuting elements 40 and 41. When this occurs, it is obvious that the electric circuit will be closed through the body of the insect and that the insect will be electrocuted. Alternatively, there could be provided a grille of an electric heater which would burn the insects to death as they contacted the same. As is shown, the electric wires 40 and 41 extend completely across the trap chamber 33 between the transparent panel 34 and the opening 32.

In the operation of the device, insects which have been drawn into the conduit 10 to the region of the opening 32 will have a natural tendency to try to escape from the conduit by flying upwardly. This will take them into the trap chamber 33 through the opening 32, and once in such chamber they are immediately attracted by light entering through the transparent panel 34. The natural tendency of the insect will be to fly toward the light, and in so doing, it will contact a pair of adjacent wires 40 and 41 and be electrocuted.

The device according to the invention can be made in any size of any suitable material, and in one form may be utilized as a ventilator to vent air from a closed room. Thus, if the cylinders 15 and 13 are so positioned that the apertures 29 thereof extend through and outwardly of the walls of a room, it is obvious that the current of air drawn into the conduit 10 will be discharged outwardly of the room through the vents 29, whereby to increase the natural circulation of air in the room and ventilate the same.

While I have shown and described what is now thought to be the preferred embodiment of the invention, it is to be understood that the same is susceptible of other forms and expressions. Consequently, I do not limit myself to the precise structure shown and described, except as hereinafter claimed.

I claim:

An insect destroyer and room ventilator comprising a first horizontally disposed cylinder having one end open and the other end closed, an outwardly flaring conduit positioned adjacent the open end of said cylinder and secured to the latter for guiding insects to be destroyed therein, there being an opening extending through the closed end of said cylinder, a trap chamber fixedly superimposed upon and in communication with said cylinder adjacent said open end, a transparent window in the end wall of said trap chamber remote from said open end of said cylinder, a vertically disposed grill of electrocuting elements dependingly supported in said trap chamber adjacent to and spaced from said transparent window, a second cylinder having both ends closed positioned below and parallel with respect to said first cylinder and having a port in communication with said first cylinder adjacent said open end of the latter, there being an opening in the closed end of said second cylinder remote from the open end of said first named cylinder, a piston positioned in each of said cylinders, means operatively connecting said pistons together for limited reciprocatory movement simultaneously in opposite directions, a flap valve positioned within said second cylinder and mounted for movement into seating engagement with said port upon reciprocatory movement of the adjacent piston toward said port and for movement out of seating engagement with said port upon reciprocatory movement of the latter named piston away from said port, each of said pistons being provided with a port extending transversely therethrough, and a valve positioned adjacent each of the ports in said pistons and mounted for movement into seating engagement with the port upon reciprocatory movement of the adjacent piston away from the open end of said first cylinder and for movement into seating engagement with said port upon reciprocatory movement of the adjacent piston away from the open end of the first cylinder.

WILLIE ALLEN MOORE.

REFERENCES CITED

The following references are of record in the file of this patent:

UNITED STATES PATENTS

| Number | Name | Date |
|---|---|---|
| 307,363 | Weiss | Oct. 28, 1884 |
| 738,184 | Goodwin | Sept. 8, 1903 |
| 1,126,994 | Harrison | Feb. 2, 1915 |
| 1,583,975 | Hunt | May 11, 1926 |
| 2,159,618 | Lindsley | May 23, 1939 |